March 4, 1930.  A. L. ARMENTROUT  1,749,057
APPARATUS FOR SEPARATING SOLIDS FROM LIQUIDS
Filed Nov. 11, 1926  2 Sheets-Sheet 1

INVENTOR
ARTHUR L. ARMENTROUT
BY
ATTORNEY

March 4, 1930. A. L. ARMENTROUT 1,749,057
APPARATUS FOR SEPARATING SOLIDS FROM LIQUIDS
Filed Nov. 11, 1926  2 Sheets-Sheet 2

INVENTOR
ARTHUR L. ARMENTROUT
BY
ATTORNEY

Patented Mar. 4, 1930

1,749,057

UNITED STATES PATENT OFFICE

ARTHUR L. ARMENTROUT, OF LOS ANGELES, CALIFORNIA

APPARATUS FOR SEPARATING SOLIDS FROM LIQUIDS

Application filed November 11, 1926. Serial No. 147,764.

My invention relates generally to the separation of solids from liquids by the use of gravity or centrifugal force, and particularly although not necessarily, to the separation of water and solid matter such as mud and sand from oil.

In the separation of sand, mud and water from oil various methods and apparatus have been devised, some of which are claimed to effect a continuous separation and discharge from the apparatus of the solid constituents of the oil so that the apparatus is permitted to operate continuously and thereby eliminate the necessity of stopping the apparatus at frequent intervals to remove the solid matter accumulated therein. So far as I am aware, none of the previous methods or apparatus are capable of effecting a continuous discharge of the solid constituents, and hence are failures as continuously operating machines.

It is a purpose of my invention to provide a method of and apparatus for separating sand, mud and water from oil by the use of centrifugal force or gravity in connection with a carrier liquid and in a manner to cause the continuous discharge of the solid matter, water and carrier liquid separately from the discharge of the oil, whereby the continuous operation of the apparatus is rendered possible. A continuous supply of carrier liquid is provided which functions to permanently retain in the apparatus a continuous quantity of the liquid in order that proper and continuous separation can be effected.

In centrifugal oil separators previously proposed quantities of emulsion are formed incident to actual separation and as a consequence the amount of oil actually recovered is greatly reduced. The formation of the emulsion is caused by introducing the carrier liquid and oil together into the apparatus which, under the centrifugal action generated, produces a thorough intermixing of the two, resulting in the emulsion.

It is a further purpose of my invention to provide a method and apparatus by which the separation of oil from its impurities is accomplished without producing emulsion, the introduction of the oil and carrier liquid being effected separately and in a manner to prevent intermixing of the two.

I will describe only one method of and two apparatus for separating solids from liquids embodying my invention, and will then point out the novel features thereof in claims.

In the drawings

Figure 1:
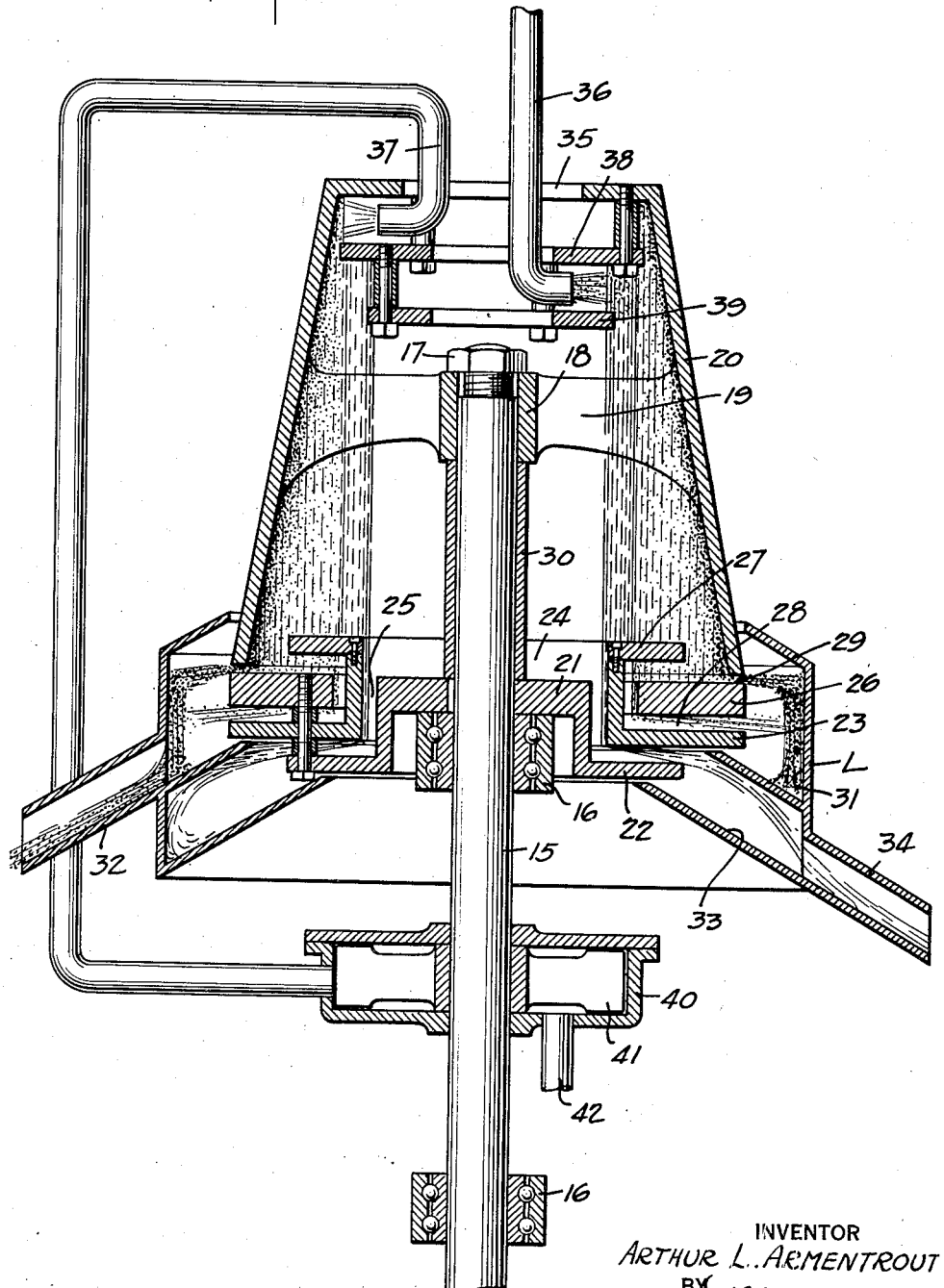
Figure 1 is a view showing in vertical section one form of apparatus for separating solids from liquids embodying my invention.

Figure 1 illustrates a centrifugal separator comprising a vertical shaft 15 rotatable in bearings 16 and having its upper end reduced and threaded to receive a nut 17 for confining a hub 18 on the shaft. The hub 18 is provided with radial arms 19, to carry a bowl 20. Keyed to the shaft is an inverted cup shaped member 21, on the large or lower end of which is an outwardly projecting annular flange 22. Above and in spaced parallel relation to the flange 22 is a second flange 23 also of annular form. The flange 23 is provided with a collar 24 disposed concentrically of the member 21 and in spaced relation thereto. The two flanges 22 and 23 and the members 21 and 24 provide an annular passage 25 L-shaped in cross section. A third flange or ring 26 is positioned above the flange 23 and between the latter and a fourth flange or ring 27 carried by the upper edge of the member 24. The members 23, 26 and 27 co-operate to provide a substantially U-shaped passage 28. It is to be noted that all of the elements just described are secured or bolted to each other so that they permanently occupy the positions described in order to form the passages 25 and 28. The bowl 20 has a downwardly divergent side wall. In the preferred form the side wall is uniformly pitched or divergent as shown in the drawings.

The lower end of the bowl 20 is shown as spaced axially with reference to the ring 26 in order to provide an annular outlet 29 which can be varied in width as desired by an axial or vertical adjustment of the bowl on the shaft 15. This adjustment is accomplished through the medium of a sleeve 30 surrounding the shaft and interposed between the hub 18 and the member 21. To adjust the bowl vertically a sleeve 30 of any desired length can be interposed between the elements 18 and 21 whereby the vertical position of the bowl is determined in accordance with the length of the sleeve.

In surrounding relation to the lower end portion of the bowl and the several flanges or rings above described is a launder or receiver designated generally at L. The receiver is constructed to provide an annular chamber 31 in receiving relation to the passage 28 of the outlet 29. This chamber is provided with an outlet 32 for discharging materials exteriorly of the apparatus. Below the chamber 31 is a second annular chamber 33 in receiving relation to the passage 25, this chamber being provided with an outlet 34.

The upper or small end of the bowl 20 is provided with an opening 35 which admits pipes 36 and 37. The outlet or lower end of the pipe 36 is disposed between spaced annular partitions 38 and 39 secured together and to the top of the bowl so as to rotate therewith. The pipe 37 has its inner or discharge end disposed above the partition 38, it being important to note the positioning of the pipes 36 and 37 with respect to the partitions. The pipe 36 constitutes a line for conducting the material to be separated, for instance crude oil from a well, interiorly of the bowl. The pipe 37 constitutes a line for supplying a carrier fluid to the bowl, and this pipe is connected to a casing 40 of a rotary pump 41, the latter being fixed to the shaft 15 so as to be actuated thereby. A pipe 42 supplies carrier fluid to the pump from a suitable source (not shown).

The operation of the apparatus shown in Figure 1 is as follows:

Through the medium of the shaft 15 the bowl 20 together with the several flanges and partitions are rotated at any desired speed, the pump 41 also being set into operation to effect a constant supply of carrier liquid to the bowl. As the material to be handled, for instance the crude oil, is discharged from the pipe 36 into the upper end of the bowl, the centrifugal force created operates to throw the solid or heavy constituents outwardly against the inner wall of the bowl. Because of the frusto-conical formation of the bowl it will be manifest that the solid or heavy constituents are caused to travel or circulate downwardly or axially through the bowl so that they are finally discharged through the outlet 29 into the chamber 31 and exteriorly of the apparatus through the spout 32. Meanwhile the lighter constituents are separated into annular concentric layers, any oil forming the inner layer and any water the outer layer so that the water is interposed between the oil and the solid or heavy constituents, all as clearly illustrated in Figure 1. The carrier liquid employed must be heavier than the oil and lighter than the heavy or solid constituents, the carrier liquid being employed for the purpose of conveying the solids and distributing them to the inner wall of the bowl. The constant supply of carrier liquid, which, in the present instance, may be water, in being discharged into the bowl at a point above the partition 38 is confined against mixing with the oil and in its downward movement within the bowl functions under the centrifugal action set up to produce the layer of water between the oil and the solid constituents. The water introduced in this manner is adapted to combine with any water contained in the oil and the two are discharged through the outlet 29 or the passage 28. In actual practice a major portion of the water is discharged through the outlet 29 with the solid constituents, the ring 27 functioning to maintain the oil separated from the water so that the oil is discharged through the passage 25 into the chamber 33. It is to be noted that the partitions 38 and 39 are of different diameters for the purpose of maintaining the carrier liquid against intermixing with the oil in its downward travel, which is a very important function of my apparatus.

The pump 41 is designed to effect the supply of an excess of the carrier liquid to the bowl so that there may at all times be maintained in the bowl a sufficient quality of the carrier liquid to effect the floating and proper separation of the solid constituents from the oil. Thus after the apparatus is set into operation a fixed quantity of the carrier liquid is at all times maintained within the bowl, assuming that the rotational speed of the bowl is constant. Should the bowl increase or decrease in its rotational speed, the operation of the pump 41 will be effected accordingly so that the quantity of carrier liquid supplied to the bowl will be increased or decreased accordingly. The discharge capacity of the outlet 29 is sufficient to take care of the discharge of the solid matter and the carrier liquid. Any excess of carrier liquid or any water contained in the oil which is introduced into the bowl which would of necessity increase the amount of carrier liquid in the bowl, is discharged through the passage 28.

From the foregoing operation it will be manifest that the apparatus may be used to advantage for separating water and solids from oil, which consists in introducing the oil and the carrier liquid separately into the bowl and in such manner that the oil and carrier liquid are maintained separated, with the carrier liquid providing a medium by which the solids of the oil can be conveyed off under the centrifugal force created to the inner wall of the bowl and subsequently discharged separately from the oil. The discharge of the oil is separate from the discharge of the solids and the carrier liquid, and such discharge is continuous as long as the apparatus is in operation, thereby preventing the accumulation of the solids within the bowl and eliminating the necessity of stopping the apparatus at frequent intervals to remove the accumulated solids.

Figure 2:
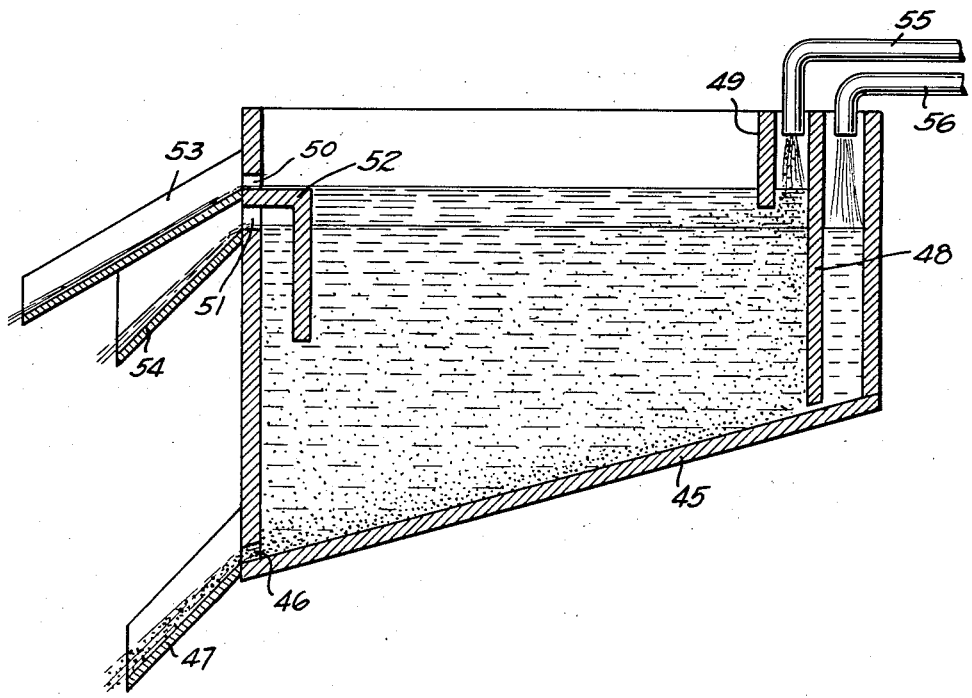
Figure 2 is a vertical sectional view of another form of apparatus for separating solids from liquids, embodying my invention.

Referring now to Figure 2, I have here shown another form of separating apparatus embodying certain principles of my invention, which is designed to illustrate another application of the invention, but instead of employing centrifugal force as in the apparatus shown in Figure 1, gravity is employed. This apparatus comprises a vessel having an inclined bottom 45, at the lower end of which is an outlet 46 communicating with a discharge spout 47. Within the vessel is a relatively long partition 48 spaced from one side of the vessel and from a second and relatively short partition 49. Outlets 50 and 51 are provided and separated by an inverted L-shaped partition 52, the two outlets being provided with discharge spouts 53 and 54, respectively. A pipe 55 may supply oil to the vessel at a point between the partitions 48 and 49, and a second pipe 56 supplies a carrier liquid such as water to the vessel at a point between the partition 49 and the adjacent side of the vessel.

In the operation of the apparatus a sufficient quantity of carrier liquid is supplied to maintain in the vessel a predetermined level thereof, any excess liquid such as the water contained in the oil being discharged from the vessel through the overflow outlet 51. As the oil is discharged into the vessel, the solids thereof precipitate through the carrier liquid on to the bottom 45 and because of the inclination of the latter it will be clear that the solids are caused to gravitate or circulate from the vessel through the outlet 46. The oil floats on the surface of the carrier liquid and is slowly discharged through the outlet 50. It is important to note that the carrier liquid is supplied to the vessel to prevent intermixing thereof with the oil so as to prevent the formation of emulsion. The partition 52 functions to produce a separate discharge of oil and carrier liquid so that the oil recovered is free of water and solids.

While my invention has been described as particularly adapted for the separation of solid matter and water from oil, it is to be understood that the process is applicable generally to any case where it is desired to separate materials of different weights such as solids from liquids and conveys off such solids by means of a second liquid.

I claim:

1. A separating apparatus comprising a centrifugal vessel of frusto-conical form, means for revolving the vessel, means for supplying a composition having a light constituent and a heavy constituent to the vessel at the small end thereof, means for supplying a carrier liquid heavier than the light constituent and lighter than the heavy constituent to the small end of the vessel but separately from the composition so as to prevent intermixing of the light constituent with the carrier liquid, and outlets at the large end of the vessel through which the light constituent is discharged from the vessel separately from the heavy constituent and the carrier liquid.

2. A separating apparatus comprising a centrifugal vessel of frusto-conical form, means for revolving the vessel, means for supplying a composition having a light constituent and a heavy constituent to the vessel at the small end thereof, means for supplying a carrier liquid heavier than the light constituent and lighter than the heavy constituent to the small end of the vessel but separately from the composition so as to prevent intermixing of the light constituent with the carrier liquid, and outlets at the large end of the vessel through which the light constituent is discharged from the vessel separately from the heavy constituent and the carrier liquid, the carrier liquid supply means being operable by the vessel revolving means so that the supply of the carrier liquid is variable with the rotational speed of the vessel.

3. A separating apparatus comprising a centrifugal vessel of frusto-conical form, means for revolving the vessel, means for supplying a composition having a light constituent and a heavy constituent to the vessel at the small end thereof, means for supplying a carrier liquid heavier than the light constituent and lighter than the heavy constituent to the small end of the vessel but separately from the composition so as to prevent intermixing of the light constituent with the carrier liquid, and outlets at the large end of the vessel through which the light constituent is discharged from the vessel separately from the heavy constituent and the carrier liquid, the carrier liquid supply means being operable by the vessel revolving means so that the supply of the carrier liquid is variable with the rotational speed of the vessel, and the outlet for the carrier liquid being proportioned with respect to the carrier liquid supply means so as to maintain within the vessel a predetermined and fixed quantity of carrier liquid.

4. A separating apparatus comprising a centrifugal vessel, means for revolving the vessel, means for supplying a composition having a light constituent and a heavy constituent to the vessel, means for supplying a carrier liquid heavier than the light constituent and lighter than the heavy constituent to the vessel but separately from the composition so as to prevent intermixing of the light constituent with the carrier liquid, and outlets in the vessel through which the light constituent is adapted to be discharged from the vessel separately from the heavy constituent and the carrier liquid, the form of the vessel being such that the centrifugal force generated is caused to discharge the composition and carrier liquid as hereinbefore specified.

5. A separating apparatus as embodied in claim 4 wherein the carrier liquid supply means being operable by the vessel revolving means so that the supply of the carrier liquid is proportional to the rotational speed of the vessel, and the outlet for the carrier liquid being proportioned with respect to the carrier liquid supply means so that the carrier liquid is maintained at a predetermined level within the vessel.

6. A separating apparatus as embodied in claim 4 wherein the vessel is provided with another outlet through which any carrier liquid in excess of the predetermined quantity in the vessel is discharged from the vessel.

7. A separating apparatus as embodied in claim 1 wherein the vessel is provided with another outlet through which any carrier liquid in excess of the predetermined quantity in the vessel is discharged from the vessel.

8. A separating apparatus comprising a shaft, a bowl fixed to the shaft for rotation therewith, inlets at one end of the bowl, partitions at the other end of the bowl spaced with respect to each other and to the bowl to form a plurality of outlets, and means for adjusting the bowl on the shaft in a manner to increase or decrease the area of one of the outlets.

9. A separating apparatus comprising a shaft, a bowl fixed to the shaft for rotation therewith, inlets at one end of the bowl, partitions at the other end of the bowl spaced with respect to each other and to the bowl to form a plurality of outlets, a pipe in communication with one of the inlets, and a pump operable by the shaft for delivering liquid from a source to the said inlet through said pipe.

10. A process of separating a composition which consists in continuously supplying the composition to one end of a centrifugal vessel, continuously supplying a carrier liquid to said end of the vessel and separately from the composition, centrifugally separating the constituents and maintaining the carrier liquid interposed between the light constituent and the heavy constituent by revolving the vessel, and continuously and separately discharging the light constituent from the other end of the vessel, the solid constituent from said other end of the vessel, and the carrier liquid from said other end of the vessel, the rates of carrier liquid supply and discharge being such as to maintain in the vessel a predetermined quantity of the carrier liquid.

11. A separating apparatus comprising a longitudinally tapered centrifugal vessel, means for revolving the vessel, means for supplying a composition having a light constituent and a heavy constituent to the vessel at the small end thereof, means for supplying a carrier liquid heavier than the light constituent and lighter than the heavy constituent to the small end of the vessel but separately from the composition so as to prevent intermixing of the light constituent with the carrier liquid, and outlets at the large end of the vessel through which the light constituent is discharged from the vessel separately from the heavy constituent and the carrier liquid.

12. A separator of the character described including, a longitudinally tapered revoluble vessel having an annular outlet opening concentric with its axis of rotation and at its point of maximum diameter, the opening being normally open to continuously pass material directly from the vessel.

ARTHUR L. ARMENTROUT.